United States Patent
Varunjikar et al.

(10) Patent No.: US 11,498,613 B2
(45) Date of Patent: Nov. 15, 2022

(54) ROAD FRICTION COEFFICIENT ESTIMATION USING STEERING SYSTEM SIGNALS

(71) Applicant: STEERING SOLUTIONS IP HOLDING CORPORATION, Saginaw, MI (US)

(72) Inventors: Tejas M. Varunjikar, Troy, MI (US); Mariam S. George, Lake Orion, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 617 days.

(21) Appl. No.: 16/276,332

(22) Filed: Feb. 14, 2019

(65) Prior Publication Data

US 2020/0262474 A1 Aug. 20, 2020

(51) Int. Cl.
| | |
|---|---|
| *B60W 40/068* | (2012.01) |
| *B62D 6/00* | (2006.01) |
| *B62D 5/04* | (2006.01) |
| *G06N 20/00* | (2019.01) |

(52) U.S. Cl.
CPC ......... *B62D 5/0481* (2013.01); *B60W 40/068* (2013.01); *B62D 6/006* (2013.01); *G06N 20/00* (2019.01)

(58) Field of Classification Search
CPC ...... B62D 5/0481; B62D 6/006; B62D 3/126; B62D 5/0463; B60W 40/068; G06N 20/00
USPC ...................................... 701/41, 42
See application file for complete search history.

(56) References Cited

U.S. PATENT DOCUMENTS

| | | | |
|---|---|---|---|
| 5,828,973 A | 10/1998 | Takeuchi et al. | |
| 6,134,490 A | 10/2000 | Ito et al. | |
| 6,155,377 A * | 12/2000 | Tokunaga | B62D 1/166 |
| | | | 180/446 |
| 7,295,908 B2 | 11/2007 | Goto et al. | |
| 8,434,583 B2 | 5/2013 | Wilson-Jones et al. | |
| 2002/0107621 A1 | 8/2002 | Byers et al. | |
| 2003/0024759 A1 | 2/2003 | Williams et al. | |
| 2003/0150366 A1 | 8/2003 | Kaufmann et al. | |
| 2004/0019417 A1 | 1/2004 | Yasui et al. | |
| 2004/0099469 A1 | 5/2004 | Koibuchi et al. | |

(Continued)

FOREIGN PATENT DOCUMENTS

| | | |
|---|---|---|
| CN | 1903633 A | 1/2007 |
| CN | 101395056 A | 3/2009 |

(Continued)

OTHER PUBLICATIONS

English Translation: Saito, Japanese Patent Publication JP 2011057036 A, Mar. 2011, Japanese Patent Office (Year: 2011).*

(Continued)

*Primary Examiner* — Nadeem Odeh
(74) *Attorney, Agent, or Firm* — Dickinson Wright PLLC

(57) ABSTRACT

According to one or more embodiments, a method includes computing, by a steering system, a model rack force value based on a vehicle speed, steering angle, and a road-friction coefficient value. The method further includes determining, by the steering system, a difference between the model rack force value and a load rack force value. The method further includes updating, by the steering system, the road-friction coefficient value using the difference that is determined.

22 Claims, 6 Drawing Sheets

(56) References Cited

U.S. PATENT DOCUMENTS

| | | |
|---|---|---|
| 2004/0189228 A1 | 9/2004 | Katch et al. |
| 2008/0027609 A1 | 1/2008 | Aoki et al. |
| 2008/0097668 A1 | 4/2008 | Tsuchiya |
| 2008/0114515 A1 | 5/2008 | Hara |
| 2008/0142293 A1 | 6/2008 | Goto et al. |
| 2008/0262692 A1* | 10/2008 | Kogure ............... B60W 40/068 701/90 |
| 2008/0294313 A1 | 11/2008 | Aoki et al. |
| 2009/0069981 A1 | 3/2009 | Barthomeuf et al. |
| 2009/0078494 A1 | 3/2009 | Dornhege et al. |
| 2009/0192679 A1 | 7/2009 | Kobayashi et al. |
| 2009/0207043 A1 | 8/2009 | Shaffer et al. |
| 2009/0271069 A1 | 10/2009 | Yamamoto et al. |
| 2010/0004824 A1 | 1/2010 | Ikeda et al. |
| 2010/0007200 A1 | 1/2010 | Pelosse |
| 2010/0292896 A1 | 11/2010 | Watanabe et al. |
| 2011/0093164 A1 | 4/2011 | Kobayashi |
| 2012/0024038 A1 | 2/2012 | Von Tardy-Tuch et al. |
| 2012/0083972 A1 | 4/2012 | Gruener et al. |
| 2012/0179333 A1* | 7/2012 | Thomys ............... B62D 15/025 701/41 |
| 2012/0191301 A1 | 7/2012 | Benyo et al. |
| 2012/0323474 A1 | 12/2012 | Breed et al. |
| 2013/0073146 A1 | 3/2013 | Konomi et al. |
| 2013/0226408 A1 | 8/2013 | Fung et al. |
| 2013/0253770 A1 | 9/2013 | Nishikawa et al. |
| 2013/0261894 A1 | 10/2013 | Kojima |
| 2014/0230533 A1 | 8/2014 | Greul et al. |
| 2015/0088380 A1 | 3/2015 | Gabor et al. |
| 2015/0367884 A1 | 12/2015 | George et al. |
| 2016/0075371 A1 | 3/2016 | Varunjikar et al. |
| 2016/0280251 A1* | 9/2016 | George ................. B62D 6/006 |
| 2016/0288825 A1* | 10/2016 | Varunjikar ........... B62D 5/0463 |
| 2017/0232998 A1* | 8/2017 | Ramanujam ........... B62D 6/003 701/42 |
| 2020/0023889 A1* | 1/2020 | Rohrmoser .............. B62D 3/12 |

FOREIGN PATENT DOCUMENTS

| | | | |
|---|---|---|---|
| CN | 101734282 A | | 6/2010 |
| DE | 10348738 A1 | | 5/2004 |
| DE | 602005004204 T2 | | 12/2008 |
| DE | 102009002245 A1 | | 10/2010 |
| DE | 102016105498 A1 | | 9/2016 |
| EP | 1275937 A2 | | 1/2003 |
| EP | 1640246 A2 | | 3/2006 |
| EP | 2177421 A2 | | 4/2010 |
| EP | 2289767 A2 | | 3/2011 |
| JP | 2010101746 A | | 5/2010 |
| JP | 2011057036 A | * | 3/2011 |
| WO | WO-2018167005 A1 | * | 9/2018 ............... B62D 3/12 |

OTHER PUBLICATIONS

Massera et al., Driver Assistance Controller for Tire Saturation Avoidance up to the Limits of Handling, Oct. 2015, IEEE, 2015 12th Latin American Robotics Symposium and 2015 3rd Brazilian Symposium on Robotics (LARS-SBR) (Year: 2015).*

Pacejka, Hans B., "Semi-Empirical Tyre Models", Published 2006, pp. 172-173.

Official Letter from the German and Patent Trademark Office for related German Application No. 102020104265.5 dated Feb. 14, 2022, 14 page(s).

* cited by examiner

ROAD FRICTION COEFFICIENT ESTIMATION USING STEERING SYSTEM SIGNALS

BACKGROUND

The forces that result in vehicle acceleration/deceleration or turning originate at tire-road interface. Longitudinal and/or lateral tire slip leads to generation of such tire forces that determine vehicle motion. The road friction coefficient is the primary factor affecting the maximum tire force. Hence, knowledge of the road friction coefficient is crucial information for vehicle control.

SUMMARY

According to one or more embodiments, a method includes computing, by a steering system, a model rack force value based on a vehicle speed, steering angle, and a road-friction coefficient value. The method further includes determining, by the steering system, a difference between the model rack force value and a load rack force value. The method further includes updating, by the steering system, the road-friction coefficient value using the difference that is determined.

According to one or more embodiments, a steering system includes a motor, and a controller that performs a method that includes computing a model rack force value based on a vehicle speed, steering angle, and a road-friction coefficient value. The method further includes determining a difference between the model rack force value and a load rack force value. The method further includes updating the road-friction coefficient value using the difference that is determined.

According to one or more embodiments, a computer program product includes a memory device that has one or more computer executable instructions stored thereon, the computer executable instructions when executed by a processor cause the processor to perform a method for determining road-friction coefficient value. The method includes computing, by a steering system, a model rack force value based on a vehicle speed, steering angle, and a road-friction coefficient value. The method further includes determining, by the steering system, a difference between the model rack force value and a load rack force value. The method further includes updating, by the steering system, the road-friction coefficient value using the difference that is determined.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

In vehicle control, knowledge of the road friction coefficient is crucial information for vehicle control. Existing technical solutions determine the road-friction coefficient while the vehicle is accelerating or decelerating the vehicle. Typically, during the accelerating/decelerating, a tire's longitudinal slip is used by brake module to determine road-friction coefficient.

Technical solutions described herein facilitate determining a change in the road-friction coefficient using steering system signals. When the vehicle is turning, the steering load and other information can be used to determine road-friction coefficient. A change in road-friction coefficient affects generation of not only lateral tire forces but also the rack forces, which closely relate to steering loads. Hence, the rack force information can be used for detection of change in road-friction coefficient in case of steering-induced lateral vehicle motion. Detection of change in road-friction coefficient using steering system signals according to the technical solutions described herein can be performed quicker than that performed by the existing techniques.

Further yet, in existing techniques that use steering system signals for detecting road-friction coefficient and/or a change thereof, the detections can be made after the steering wheel has come to a steady-state condition. As such, some subset of driving maneuvers, where the steady-state condition is not met, cannot be used for determining the road-friction. Further, the detection in existing techniques is typically binary or (tri-state) and cannot be performed in a continuous manner.

The technical solutions described herein address such technical challenges to estimate road-friction coefficient using steering signals in a continuous manner. A virtual sensor module calculates steering loads while a vehicle model predicts reference steering loads. Comparison of predicted and calculated steering loads is used to iteratively predict road friction coefficient using signal processing techniques. Furthermore, the output of the road-friction coefficient is a friction coefficient number, between 0.1 and 0.9, that updates continuously while vehicle drives on different surfaces. The technical solutions described herein are applicable to both EPS (Electric Power Steering) and SbW (Steer-by-Wire) systems.

Figure 1:
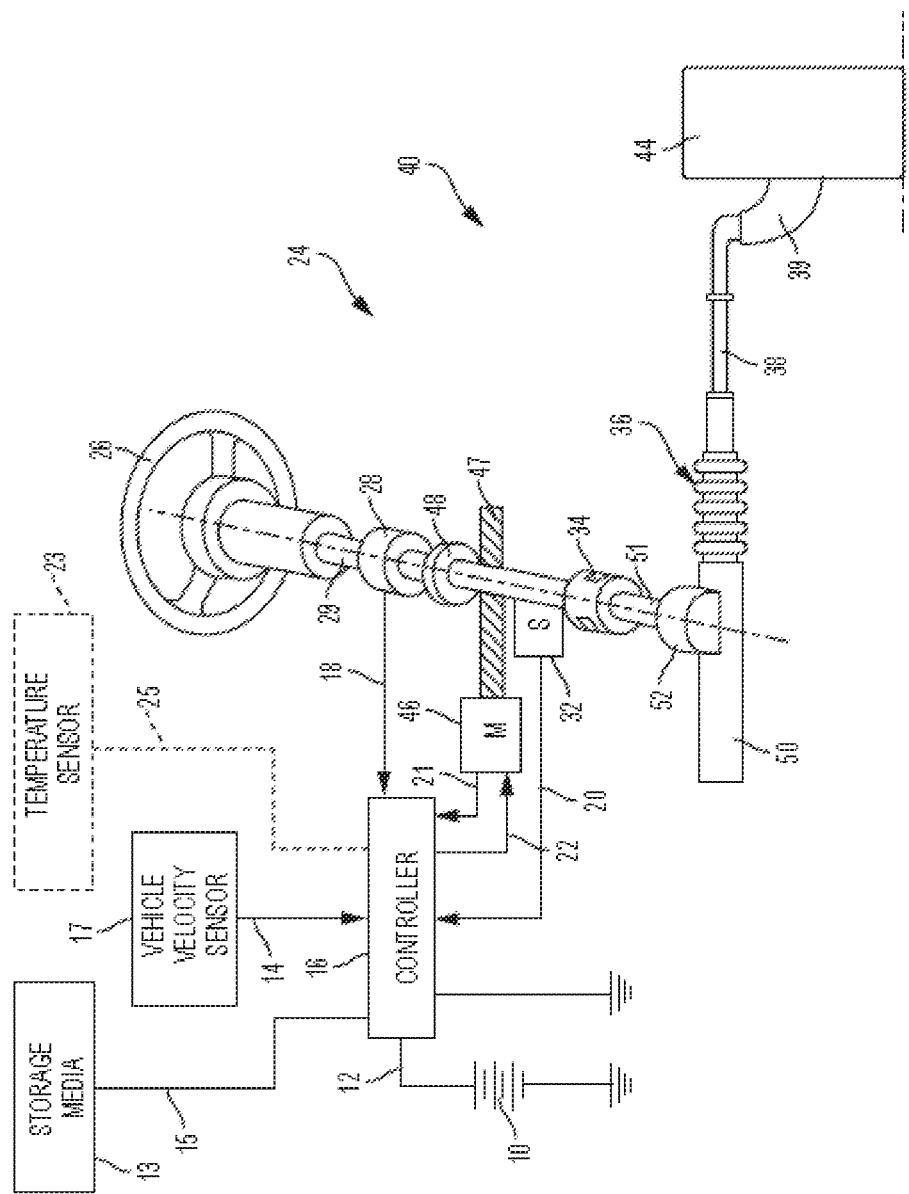
FIG. 1 depicts an EPS system according to one or more embodiments.
Figure 2:
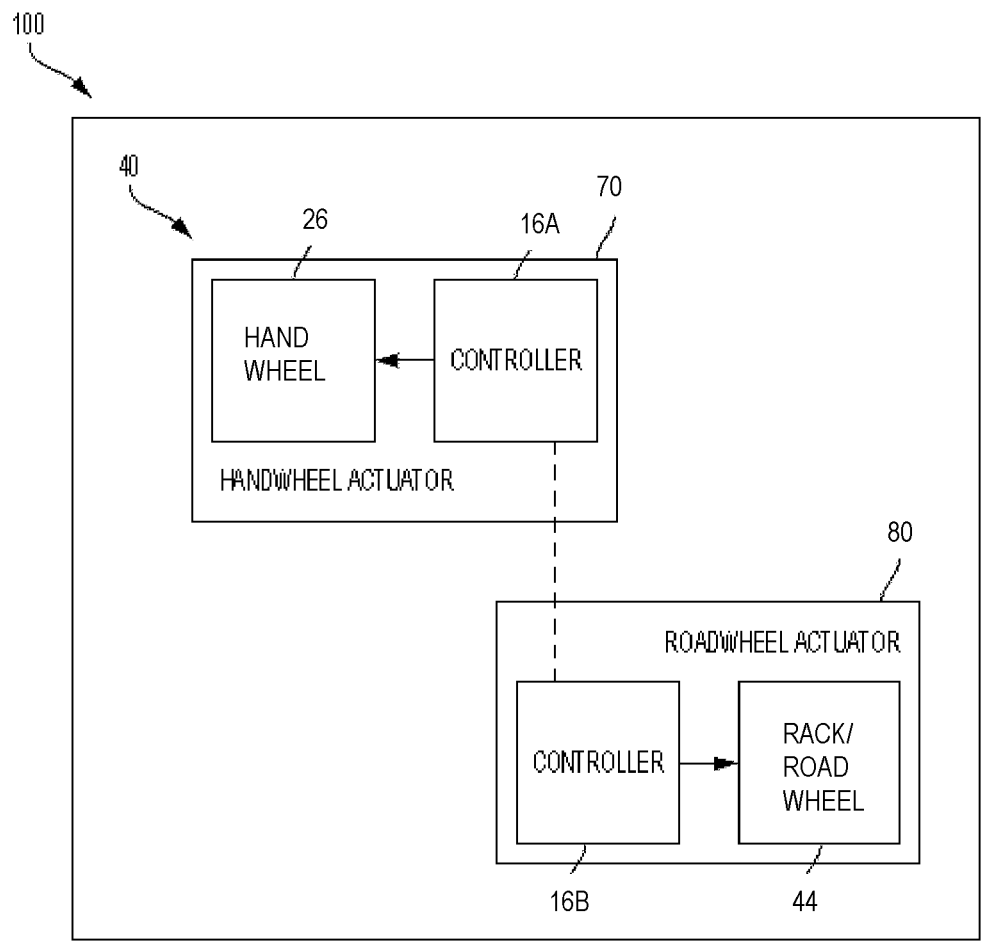
FIG. 2 is an exemplary embodiment of a SbW system 40 for implementation of the described embodiments.

Referring now to the Figures, where the technical solutions will be described with reference to specific embodiments, without limiting same, FIG. 1 is an exemplary embodiment of an EPS 40 in a vehicle 100 suitable for implementation of the disclosed embodiments, and FIG. 2 is an exemplary embodiment of a SbW system 40 for implementation of the described embodiments. Unless specifically described otherwise, the present document refers to a steering system 40 that can be either an EPS or a SbW or any other type of steering system in which the technical solutions described herein can be used.

In FIG. 1, the steering mechanism 36 is a rack-and-pinion type system and includes a toothed rack (not shown) within housing 50 and a pinion gear (also not shown) located under gear housing 52. As the driver input, hereinafter denoted as a handwheel or steering wheel 26 is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) or tire(s) 44 (only one shown). Although a rack-and-pinion type system is described herein, the EPS in other embodiments can be a column assist EPS (CEPS), pinion assist EPS (PEPS), dual pinion assist EPS, or any other type of EPS.

Electric power steering assist is provided through the control apparatus generally designated by reference numeral 24 and includes the controller 16 and an electric motor 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the handwheel 26 is turned, torque sensor 28 senses the torque applied to the handwheel 26 by the vehicle driver. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 46 and the desired torque, the position and/or speed of the rotor and the torque applied by a driver are determined. A position encoder is connected to the lower steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the lower steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 may be located at the electric motor 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, motor velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces.

Additional features of controller 16 and certain processes therein are thoroughly discussed at a later point herein.

FIG. 2 depicts an exemplary SbW system according to one or more embodiments. The SbW system 40 includes a handwheel actuator (HWA) 70 and a roadwheel actuator (RWA) 80. The controller 16 is split into two blocks, a controller 16A and a controller 16B associated with the HWA 70 and the RWA 80 respectively. In other examples, the controller 16 can be distributed in any other manner.

The HWA 70 includes one or more mechanical components, such as the handwheel 26 (steering wheel), a steering column, a motor/inverter attached to the steering column either through a gear mechanism or a direct drive system. The HWA 70 further includes the microcontroller 16A that controls the operation of the mechanical components. The microcontroller 16A receives and/or generates torque via the one or more mechanical components. For example, the microcontroller 16A can send a torque command request to a motor/inverter that will generate such torque.

The RWA 80 includes one or more mechanical components, such as a steering rack coupled to a motor/inverter through a ball-nut/ball-screw (gear) or pinion gear arrangement, and the rack is connected to the vehicle roadwheels/tires 44 through tie-rods. The RWA 80 includes the microcontroller 16B that controls the operation of the mechanical components. The microcontroller 16B receives and/or generates torque via the one or more mechanical components. For example, the microcontroller 16B can send a torque command request to a motor/inverter that will generate such torque.

The microcontrollers 16A and 16B are coupled through electrical connections that allow signals to be transmitted/received. As referred to herein, a controller can include a combination of the HWA controller 16A and the RWA controller 16B, or any one of the specific microcontrollers.

In one or more examples, the controllers 16A and 16B of the SbW system 40 communicate with each other through CAN interface (or other similar digital communication protocols). Guidance of the vehicle 100 that is fitted with the SbW system 40 is performed by use of the steering gear. The RWA 80 receives an electronic communication signal of rotation of the steering wheel by the driver. A driver controls the steering wheel to directionally control the vehicle 100. The angle from HWA 70 is sent to the RWA 80 which performs position control to control rack travel to guide the roadwheel. However, due to the lack of mechanical connection between the steering wheel and the road wheels, the driver is not readily provided with a feel for the road without torque feedback (unlike the case in an EPS as described earlier).

In one or more examples, the HWA 70 that is coupled to the steering column and steering wheel simulates the driver's feel of the road. The HWA 70 may apply tactile feedback in the form of torque to the steering wheel. The HWA 70 receives a rack force signal from the RWA 80 to generate an appropriate torque feel for the driver. Alternatively, the handwheel angle and vehicle speed can also be used to generate desired torque feel to the driver.

As noted earlier, the SbW and EPS described herein are exemplary, and the technical solutions described herein are applicable to any type of a steering system, and as such, unless specifically mentioned otherwise, a "steering system 40" herein refers to any type of steering system.

Figure 3:
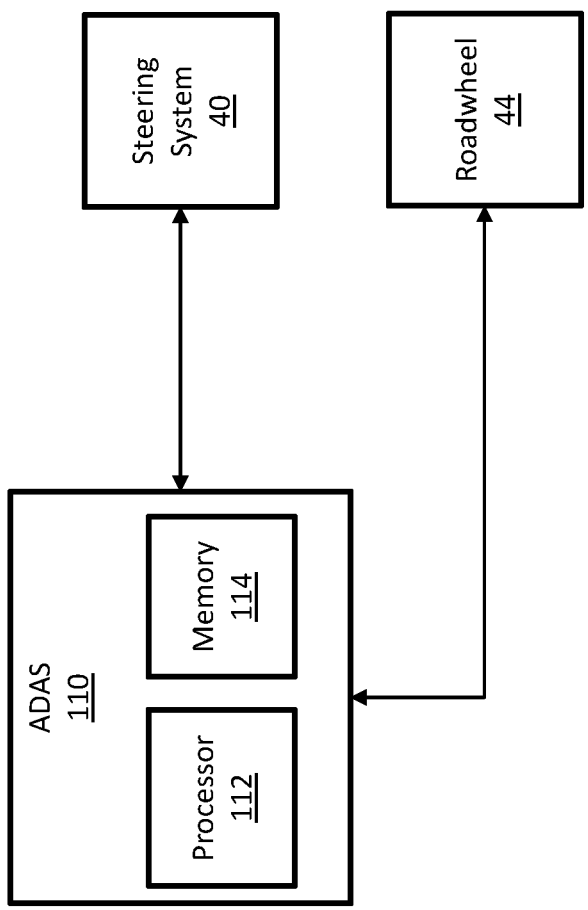
FIG. 3 depicts an automated driver assistance system according to one or more embodiments.

FIG. 3 depicts an automated driver assistance system according to one or more embodiments. It will be appreciated that the steering system 40 shown and described can be used in an autonomous or semi-autonomous vehicle or in a more conventional vehicle. An advanced drive assistance system (ADAS) 110 can be coupled with the steering system 40, the roadwheels 44 (via one or more control unit), and other control units in the vehicle 100. The ADAS 110 can include one or more processors 112 and one or more memory devices 114. The ADAS 110 receives one or more input signals including data and/or commands from the control units, such as the controller 16 of the steering system 40. The ADAS 110 can further send signals including data and/or commands to the control units, such as the controller 16 of the steering system 40. The ADAS 110 can further receive input from the human driver, such as a destination, one or more preferences and the like. The ADAS 110 can provide notifications to the driver, such as during an interaction with the driver, and/or in response to one or more conditions in the vehicle 100.

The ADAS 110, in one or more examples, determines a trajectory of travel for the vehicle 100 automatically. The trajectory can be generated based on an input from the driver and based on one or more input signals received from the control units, such as the road-friction coefficient. In addition, in one or more examples, the ADAS 110 can be in communication with external modules (not shown) such as traffic servers, road map servers and the like to generate a route/path for the vehicle 100 from a source to a destination. The ADAS 110 sends one or more commands to the control units to maneuver the vehicle based on the generated route and/or trajectory. It should be noted that while a "route" is a high-level mapping for the vehicle to reach a destination location on a map (e.g. home, office, and restaurant) from a source location, a "trajectory" is a specific set of maneuvers to be performed for the vehicle 100 to move from its present position to a next position on the route. The ADAS 110 can perform maneuvers that can include changes to, but not limited to, vehicle direction, vehicle speed, vehicle acceleration, and the like. To perform such maneuvers, the ADAS 110 sends one or more commands to the corresponding control unit(s).

Regardless of whether the vehicle 100 is being driven using an ADAS 110 or manually by a driver, maneuvering the vehicle 100 is generally performed based on a road-friction coefficient value, which determines maximum tire grip in lateral and longitudinal direction. The road-friction coefficient is crucial information for vehicle handling (manual & autonomous). Although a human driver may not see the numeric value of the coefficient during the maneuvers, s/he feels the "dry", "wet", "snowy", and other such types of surfaces because of varied road-friction coefficient of such surfaces when driving the vehicle 100, and typically, maneuvers the vehicle 100 accordingly. The ADAS 110 may maneuver the vehicle 100 based on a road-friction coefficient value. Henceforth, in the present document, the term "operator" is used to refer to both the human driver and the ADAS 110, both of which can maneuver the vehicle 100 based on the road-friction coefficient.

The quicker a change in the road-friction coefficient value can be detected and indicated to the operator, the quicker the operator can react and maneuver the vehicle 100 differently. For example, if the vehicle moves from a dry surface to a slippery surface (e.g. ice patch), the vehicle 100 has to be maneuvered differently to avoid skidding; for example, the vehicle's stability control may engage for smaller steering and/or braking inputs on a slippery road compared to dry road.

Figure 4:
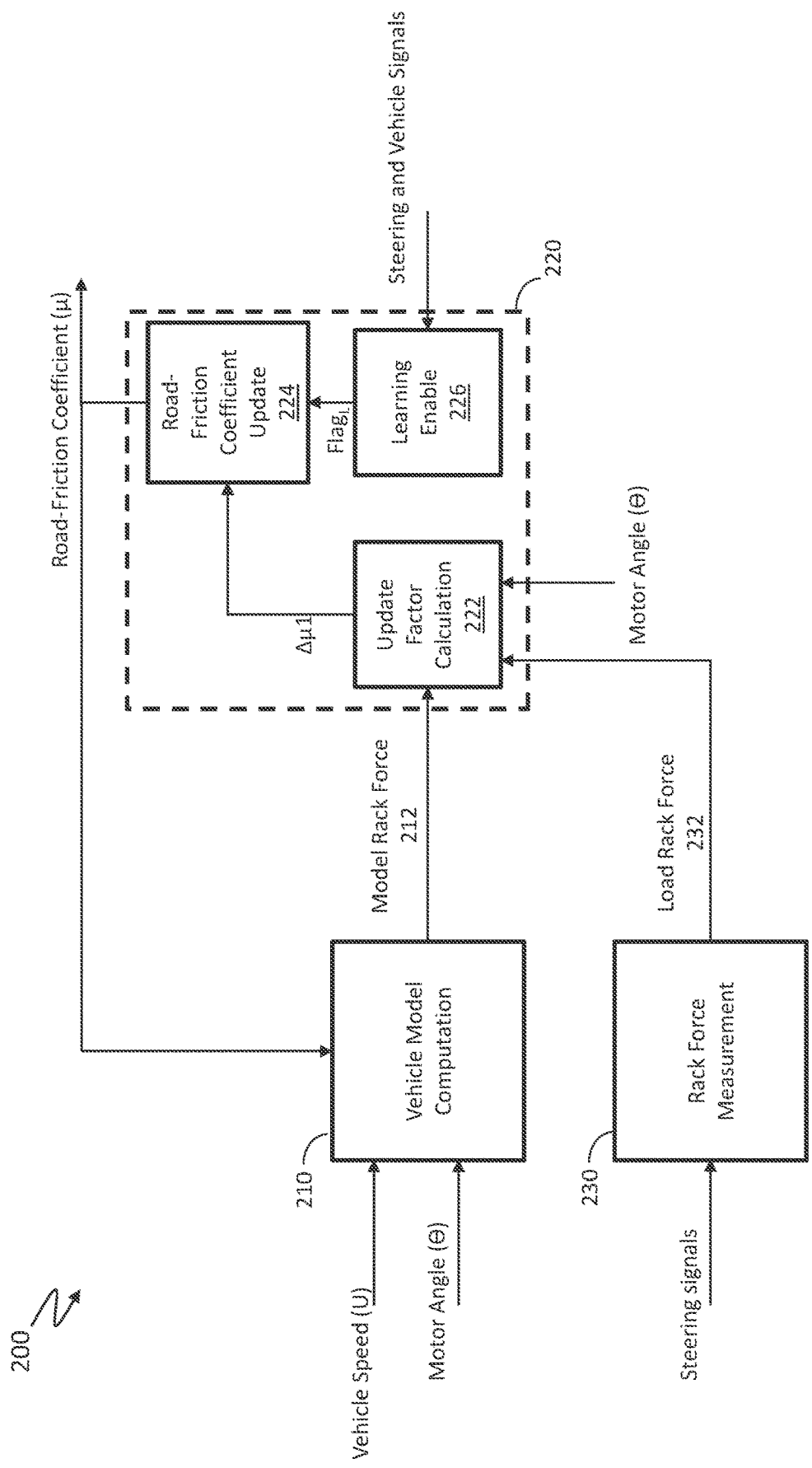
FIG. 4 depicts a block diagram of a system for continuously and iteratively updating road-friction coefficient value according to one or more embodiments.

FIG. 4 depicts a block diagram of a system for continuously and iteratively updating road-friction coefficient value according to one or more embodiments. The system 200 is a steering-signals-based system, which can detect change in the road-friction coefficient quicker than brakes for active steering inputs. The system 200 can be part of the steering system 40 as a separate electronic circuit, in one or more examples. Alternatively, or in addition, at least some parts of the system 200 can be implemented by the steering system 40 using the controller 16. In one or more examples, the system 200 includes one or more computer executable instructions that are stored on a memory device.

The system 200 includes a vehicle model computation 210, a road-friction coefficient ($\mu$) computation 220, and a rack force measurement 230, among other components.

Figure 5:
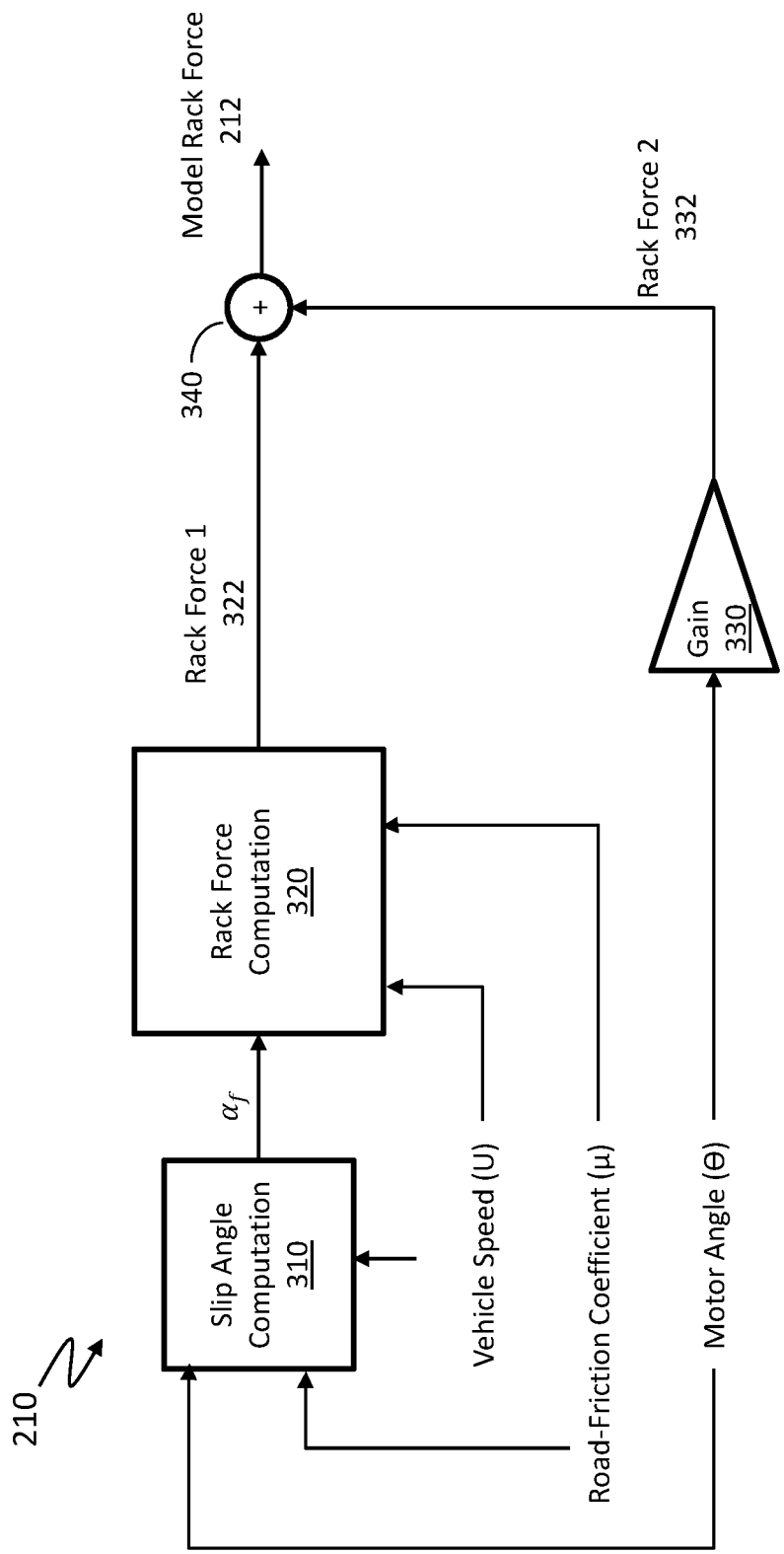
FIG. 5 depicts a block diagram of an example vehicle model computation according to one or more embodiments.

FIG. 5 depicts a block diagram of an example vehicle model computation according to one or more embodiments. The vehicle model computation 210 uses a predetermined vehicle model to compute a model rack force 212. The vehicle model is a nonlinear vehicle model that computes the model rack force 212 directly from slip angles.

The vehicle model computation includes a module for slip angle computation 310. In one or more examples, the slip angle computation 310 uses bicycle model with road-friction ($\mu$) dependent nonlinear tire force curves and tire lag dynamics to obtain a front axle slip angle ($\alpha_f$). As noted earlier, the road-friction coefficient used as input is an estimated value (i.e. output of road-friction coefficient computation 220) from a previous iteration, $\hat{\mu}$, which is updated iteratively. The slip angle $\alpha_f$ along with predicted road friction coefficient $\hat{\mu}$ and a vehicle speed (U) is used to obtain the model rack force 212.

The slip angle computation 310 uses a steering angle ($\theta$) (handwheel position or motor angle) measured by the steering system 40. The steering angle is converted to a tire angle using look up tables or a multiplier. Bicycle model equations are used to calculate yaw rate and lateral velocity states. The yaw dynamics equation that can be used includes:

$$I_{zz}\dot{r}=aF_{cf}-bF_{cr}$$

Further, a lateral dynamics equation that can be used includes:

$$m(\dot{V}+rU)=F_{cf}+F_{cr}$$

In the above equations, Izz: Rotational inertia, r: Yaw Rate, a: distance between center of gravity (CG) and front axle, b: distance between CG and rear axle, V: Lateral velocity at CG, U: Longitudinal velocity at CG, $F_{cf}$: Front axle force, and $F_{cr}$: Rear axle force.

Further, the vehicle model computation 210 includes a module for rack force computation 320. The rack force computation uses the slip angle $\alpha_f$ and road-friction coefficient ($\mu$) with a nonlinear (Fiala) tire model to calculate lateral tire forces:

$$F_y = \begin{cases} -C_\alpha \tan\alpha + \frac{C_\alpha^2}{3}|\tan\alpha|\tan\alpha I_\alpha, & |\alpha| \le \alpha_{sl} \\ -\frac{1}{I_f}\,\text{sgn}\,\alpha, & \text{else} \end{cases}$$

$$\alpha_{sl} = \tanh^{-1}\left(\frac{3}{C_\alpha I_f}\right)$$

$$I_f = \mu \times \text{Vertical load of axle}$$

where $F_y$: tire lateral force, $C_\alpha$: cornering stiffness parameter, $\alpha$: tire slip angle, $I_f$: inverse of maximum lateral tire force which is a function of $\mu$, and $\alpha_{sl}$: sliding slip angle.

The slip angles for front and rear axle can be obtained using equations (shown below). The computed values are filtered using a vehicle speed dependent filter to represent tire relaxation length dynamics. A lagged slip angle (i.e. output of low-pass filter) is used as front or rear tire slip angle in equations mentioned above as well.

$$\alpha_f = \frac{(V+a \cdot r)}{U} - \delta$$

$$\alpha_r = \frac{(V-b \cdot r)}{U}$$

where $\alpha_f$: front axle slip angle, $\alpha_r$: rear axle slip angle, and $\delta$: tire angle. The tire angle is derived from motor angle using kinematic tables or a gain factor.

The model rack force 212 is summation of two forces—rack force 1 322, and rack force 2 332. Rack force 1 322 is obtained using front slip angle, vehicle speed, and motor angle using either nonlinear tables or empirical models or tire models. Rack force 2 332 is obtained by a gain module 330 using the motor angle and a spring model, or any other model or a lookup table. The rack force 2 332 represents jacking torque and other additional torques/forces that act on the vehicle 100 due to suspension geometry as a function of the motor angle. The rack force 1 322 and the rack force 2 332 are added (340) to compute the model rack force 212.

Referring back to FIG. 4, the model rack force 212 is input into the road-friction coefficient computation 220. In addition, the road-friction coefficient computation 220 receives a load rack force 232 from the rack force measurement 230. In one or more examples, the load rack force 232 is a measurement from a force/torque sensor that measures the force/torque experienced by the rack during the vehicle maneuvers. Alternatively, or in addition, the load rack force 232 is computed using a rack force observer that uses steering signals such as steering motor torque, steering velocity and steering handwheel torque (for EPS) to calculate the load rack force 232. The load rack force 232 is a virtual rack force calculated from driver and motor efforts which are measured. Accordingly, the load rack force 232 is a reference to which the model rack force 212 is compared.

In one or more examples, the road-friction coefficient computation is performed is based on least-mean square (LMS) filtering, however, other equivalent filtering techniques can be used to achieve substantially similar results. In the example shown in FIG. 2, the road-friction coefficient computation 220 includes one or more modules for update factor computation 222, a road-friction coefficient update 224, and enable learning 226.

The update factor computation 222 computes a difference (e1) between the two input rack forces that are input to the road-friction coefficient computation 220. The road-friction coefficient computation 220 receives the model rack force 212 and the load rack force 232. Accordingly:

e1=Load Rack Force−Model Rack Force

In one or more examples, the error e1 is processed to compute an adjusted error value e2. The adjusted error e2 is computed by applying a low pass filter to the e1 value, where the low pass filter is function of the vehicle speed (U), steering angle (θ), and steering velocity.

The difference e2 is used to calculate an update factor ($\Delta\mu_1$) using following calculations:

$$u = \frac{\theta}{\text{constant} + \theta^2}$$
$$\Delta\mu_1 = k \cdot e2 \cdot u$$

Here, u is a system input such as a steering angle, or a function of the steering angle as shown. In other examples, u can be computed in a different manner. Further, in the above equations, k is a predetermined value that can be configurable. The update factor computation 222 outputs the update factor $\Delta\mu_1$ thus calculated.

The road-friction coefficient update 224 receives the update factor as input and sets up a second update value $\Delta\mu$ for the road-friction coefficient based on the input value and on a learning-enable flag ($\text{Flag}_L$) that is output by the enable learning 226.

The enable learning 226 uses vehicle and steering signals to determine if conditions are favorable for updating the road-friction coefficient value. One or more of the following conditions can be used: if vehicle acceleration/deceleration is below a threshold; if steering velocity magnitude is more than a threshold; if steering angle magnitude is more than a threshold; if multiplication of steering angle and steering velocity is more than a threshold; if vehicle is not in oversteer condition, etc. Determining the oversteer condition can either be computed by the steering system 40 or by other modules of the vehicle 100, such as brake controller (not shown) using known techniques. Based on assessment of the one or more above conditions, the enable learning 226 outputs the $\text{Flag}_L$, a Boolean output—TRUE indicating favorable conditions to update the road-friction coefficient value and FALSE indicative that the road-friction coefficient value is not to be updated at this time.

The road-friction coefficient update 224 determines the second update factor to make an update to road-friction coefficient estimate based on the $\text{Flag}_L$:

$$\Delta\mu = \begin{cases} \Delta\mu_1 & \text{if } Flag_L \text{ is TRUE} \\ 0 & \text{if } Flag_L \text{ is FALSE} \end{cases}$$

The road-friction coefficient value ($\hat{\mu}$ or $\mu_{t+1}$) is updated using the second update factor and the present road-friction coefficient value:

$$\mu_{t+1} = \mu_t + \Delta\mu$$

Figure 6:
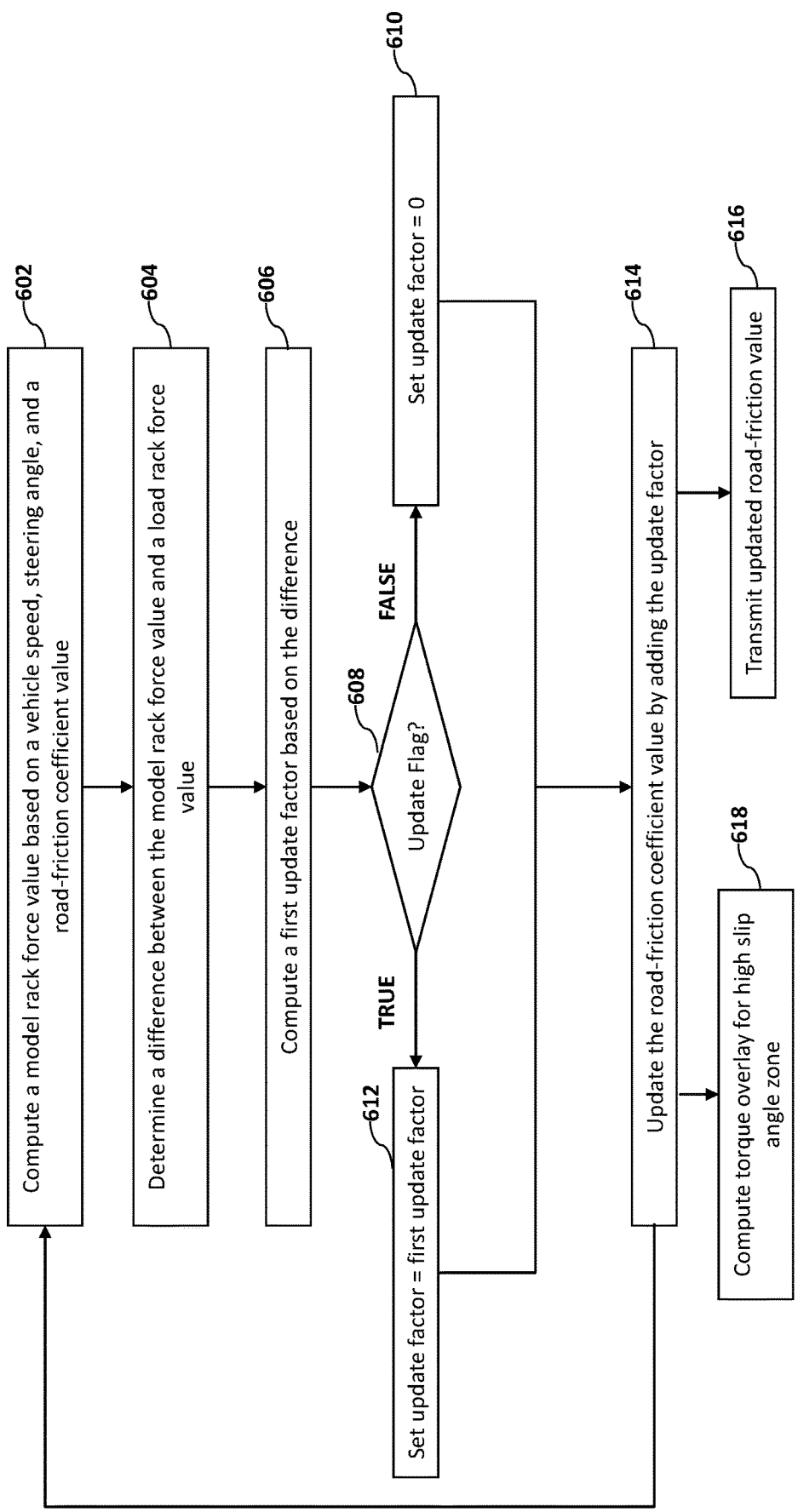
FIG. 6 depicts a flowchart of an example method for detecting a change in road-friction coefficient value and updating the road-friction coefficient value accordingly in a steering system according to one or more embodiments.

FIG. 6 depicts a flowchart of an example method for detecting a change in road-friction coefficient value and updating the road-friction coefficient value accordingly in a steering system according to one or more embodiments. The method includes computing the model rack force value 212 based on a vehicle speed, steering angle, and a present road-friction coefficient value, at 602. The model rack force value 212 is computed using a front slip angle that is determined based on a vehicle model, such as a non-linear vehicle model as described herein.

The method further includes determining a difference between the model rack force value 212 and the load rack force value 232, at 604. The load rack force value 232 is determined based on an estimate using a state observer, in one or more examples. Alternatively, or in addition, the load rack force 232 can be measured by a tie rod sensor. Any other techniques can be used to estimate the load rack force 232. The computed difference is further processed, for example, scaled using one or more factors to compute a first update factor, at 606. The scaling factors can be based on one or more steering signals such as steering angle, steering speed, and the like.

The method further includes computing an update flag based on one or more steering signals and vehicle signals, at 608. The update flag is indicative of whether to update the road-friction coefficient value. If the update flag is FALSE, that is, indicative that the road-friction coefficient is not to be updated, the update factor is set to 0 (zero), at 610. Alternatively, if the update flag is TRUE, that is, indicative that the road-friction coefficient can be updated, the update factor is set to the first update factor that is computed, at 612. Further, the update factor is added with the present road-friction coefficient value to compute the updated road-friction coefficient value, at 614.

In one or more examples, the updated road-friction coefficient value is transmitted to one or more other modules in the vehicle 100, at 616. For example, the ADAS 110 receives the updated road-friction coefficient value to adjust trajectory for the vehicle 100. Alternatively, or in addition, the updated road-friction coefficient value is broadcast to a brake module, an electronic stability control module, and other such modules in the vehicle 100 that control one or more vehicle maneuvers based on an input from the operator. For example, the brake module can change how responsive the brakes operate, that is rate of deceleration when the brakes are pumped, or how brakes are applied to individual wheels based on the updated road-friction coefficient value. Further yet, a user notification can be provided, such as via a tactile feedback, an audio-visual feedback, and the like.

Further, the updated road-friction coefficient value can be transmitted to another vehicle using a vehicle-to-vehicle network (not shown) that facilitates one or more vehicles to communicate with each other, particularly to share travel conditions.

Further yet, the updated road-friction coefficient is used by the steering system 40 itself to modify steering efforts, for example, in closed-loop EPS, SbW, and/or magnetic torque overlay (MTO). For example, the model rack force that is computed based on the updated road-friction coefficient is used to compute a handwheel torque reference for the operator. For example, the controller 16 generates an assist torque command based on the handwheel torque reference for the motor 46 to generate the assist torque. The assist torque command is generated based on a difference between the model rack force 212 and an input torque applied by the operator to the handwheel 26. In case of a SbW, the model rack force is used to generate a feedback torque by the HWA 70, the feedback torque providing surface feeling to the operator in absence of the mechanical linkage.

In one or more examples, the steering system 40 applies a steering torque overlay to help the operator stay away from a high slip angle zone, at 618. For example, if the updated road-friction coefficient is below a predetermined threshold, the controller 16 deems that the vehicle 100 is traveling along a slippery surface, such as wet, icy etc. in such a case, the controller 16 limits the steering angle value. In one or more examples, the controller 16 generates an overlay torque command that causes the motor 46 to generate an overlay torque that opposes the input torque being applied by the operator. The overlay torque prevents, and at least limits, the operator from maneuvering the vehicle 100, which may improve safety of the vehicle 100. The overlay torque is generated based on the updated road-friction coefficient value in one or more examples, the overlay torque is generated when the updated road-friction coefficient is below a predetermined threshold, indicative of the road being slippery.

Accordingly, the technical solutions described herein facilitate detecting a change in road-friction coefficient value in a steering system. The road-friction coefficient value computations described herein have demonstrated substantial improvements over existing techniques, particularly those using brake modules. Such improvements include a faster detection of the change in road-friction coefficient value.

Further, the technical solutions described herein facilitate calculating continuous road-friction coefficient ($\mu$) using steering signals. A vehicle model is used to calculate a rack force as a function of $\mu$ that is being estimated continuously. The calculated rack force is compared with an estimated rack force from a steering observer or from a tie rod sensor. The road-friction coefficient is calculated using both rack forces. In one or more examples, the road-friction coefficient is updated only when learning enable conditions are met.

The technical solutions described herein facilitate using steering system signals for detecting a change in road-friction coefficient. The detected change can be used to change an assist torque or other torque generated by the steering system and/or other modules of the vehicle. For example, if the change in road-friction coefficient indicates that the vehicle is now traveling on a slippery surface (such as snow, hydro-plane etc.) the steering wheel maneuvers can be prohibited by generating torque that prevents an operator from moving the steering wheel. Alternatively, or in addition, in case of an ADAS system, the detected change in road-friction can cause the ADAS system to change one or more operating conditions of the vehicle, such as the vehicle speed, steering angle, and the like.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A method comprising:
   computing, by a controller of a steering system that includes at least a motor: a first rack force value and a second rack force value, wherein, the first rack force value is calculated, based on a vehicle speed, steering angle, and a road friction coefficient value, using a bicycle model and wherein the second rack force value is calculated, based on motor angle, using a spring model;
   calculating a model rack force value based on the sum of the first rack force value and the second rack force value;
   determining, by the controller, a difference between the model rack force value and a load rack force value, wherein the load rack force value is estimated using a state observer model based at least one of a steering motor torque signal and a steering velocity signal;

updating, by the controller, the road-friction coefficient value using the difference that is determined; and selectively controlling the motor of the steering system based on at least the updated road-friction coefficient value.

2. The method of claim 1, wherein the load rack force value is an estimated value of tire load at a rack.

3. The method of claim 1, wherein the bicycle model includes a non-linear bicycle vehicle model.

4. The method of claim 1, wherein the road-friction coefficient value is updated based on an update flag that is set based on one or more steering system signals and vehicle signals.

5. The method of claim 1, wherein the road-friction coefficient value is a first road-friction coefficient value, and updating the road-friction coefficient value comprises:

computing an update factor based on the difference between the model rack force value and the load rack force value; and computing a second road-friction coefficient value by adding the update factor into the first road-friction coefficient value.

6. The method of claim 1, further comprising:

computing a handwheel torque reference value based on the updated road friction coefficient value, the handwheel torque reference value is summed with an input torque from an operator to the steering system.

7. The method of claim 6, wherein an overlay torque that is opposite in direction to the input torque is generated in response to determining that based on the updated road-friction coefficient value, the road condition has become, at least one of: wet and icy.

8. The method of claim 7, further comprising, transmitting the updated road friction coefficient value to an advanced drive assist system.

9. The method of claim 1, further comprising, changing a maneuver of the steering system based on a difference between the road-friction coefficient value and the updated road-friction coefficient value being above a predetermined threshold.

10. A steering system comprising:

a motor; and a controller configured to:

compute a first rack force value and a second rack force value, wherein, the first rack force value is calculated, based on a vehicle speed, steering angle, and a road friction coefficient, using a bicycle model, and the second rack force value is calculated, based on motor angle, using a spring model;

calculate a model rack force value based on the sum of the first rack force value and the second rack force value;

determine a difference between the model rack force value and a load rack force value, wherein the load rack force value is estimated using a state observer model based at least one of a steering motor torque signal and a steering velocity signal;

update the road-friction coefficient value using the difference that is determined; and selectively control the motor based on at least the updated road-friction coefficient value.

11. The system of claim 10, wherein the load rack force value is an estimated value of tire load at a rack.

12. The system of claim 10, wherein the bicycle model includes a non-linear bicycle model.

13. The system of claim 10, wherein the road-friction coefficient value is updated based on an update flag that is set based on one or more steering system signals and vehicle signals.

14. The system of claim 10, wherein the road-friction coefficient value is a first road-friction coefficient value, and updating the road-friction coefficient value comprises:

computing an update factor based on the difference between the model rack force value and the load rack force value; and computing a second road-friction coefficient value by adding the update factor into the first road-friction coefficient value.

15. The system of claim 10, wherein the controller is further configured to:

compute a handwheel torque reference value based on the updated road friction coefficient value, the handwheel torque reference value is summed with an input torque from an operator to the steering system.

16. The system of claim 10, wherein an overlay torque is generated based on the updated road-friction coefficient value.

17. A computer program product comprising a non-volatile memory device that has one or more computer executable instructions stored thereon, the computer executable instructions when executed by a processor cause the processor to:

compute a first rack force value and second a second rack force value, wherein, the first rack force value is calculated, based on vehicle speed, steering angle and a road friction coefficient value, using a bicycle model, and the second rack force value is calculated, based on motor angle, using a spring model;

calculate a model rack force value by adding the first rack force value and the second rack force value;

determine a difference between the model rack force value and a load rack force value, wherein the load rack force value is estimated using a state observer model based at least one of a steering motor torque signal and a steering velocity signal;

update the road-friction coefficient value using the difference that is determined; and selectively control a motor of a steering system based on at least the updated road-friction coefficient value.

18. The computer program product of claim 17, wherein the load rack force value is an estimated value of tire load at a rack.

19. The computer program product of claim 17, wherein the road-friction coefficient value is updated based on an update flag that is set based on one or more steering system signals and vehicle signals.

20. The computer program product of claim 17, wherein the road-friction coefficient value is a first road-friction coefficient value, and updating the road friction coefficient value comprises:

computing an update factor based on the difference between the model rack force value and the load rack force value; and computing a second road-friction coefficient value by adding the update factor into the first road-friction coefficient value.

21. The computer program product of claim 17, wherein the instructions further cause the processor to:

compute a handwheel torque reference value based on the updated road friction coefficient value, the handwheel torque reference value is summed with an input torque from an operator.

22. The computer program product of claim 17, wherein an overlay torque is generated based on the updated road-friction coefficient value.

\* \* \* \* \*